United States Patent
Matsuoka (10) Patent No.: US 9,446,903 B2
(45) Date of Patent: Sep. 20, 2016

(54) CONVEYING APPARATUS

(71) Applicant: TOYOTA JIDOSHA KABUSHIKI KAISHA, Toyota-shi, Aichi (JP)

(72) Inventor: Hirofumi Matsuoka, Nagoya (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/783,124

(22) PCT Filed: Oct. 30, 2013

(86) PCT No.: PCT/JP2013/079381
§ 371 (c)(1),
(2) Date: Oct. 8, 2015

(87) PCT Pub. No.: WO2014/167748
PCT Pub. Date: Oct. 16, 2014

(65) Prior Publication Data
US 2016/0046446 A1 Feb. 18, 2016

(30) Foreign Application Priority Data
Apr. 11, 2013 (JP) .................................. 2013-083264

(51) Int. Cl.
*B65G 17/20* (2006.01)
*B65G 17/42* (2006.01)
*B65G 17/38* (2006.01)

(52) U.S. Cl.
CPC .............. *B65G 17/42* (2013.01); *B65G 17/20* (2013.01); *B65G 17/38* (2013.01); *B65G 2201/02* (2013.01)

(58) Field of Classification Search
CPC ............................. B65G 17/20; B65G 17/42

USPC ........................................................ 198/465.4
See application file for complete search history.

(56) References Cited

U.S. PATENT DOCUMENTS

| 2,019,700 | A |   | 11/1935 | Gyatt |   |
|---|---|---|---|---|---|
| 2,156,353 | A | * | 5/1939 | Ranney | 174/121 R |
| 2,928,525 | A | * | 3/1960 | Schaeffer | B65G 15/08 138/128 |
| 3,139,175 | A | * | 6/1964 | Wells | B65G 17/42 104/93 |
| 3,343,650 | A | * | 9/1967 | Brown | B65G 17/42 198/861.2 |
| 3,442,950 | A | * | 5/1969 | Barker | C07C 209/18 564/402 |
| 3,910,403 | A | * | 10/1975 | Morsbach | B61B 12/02 104/173.1 |

(Continued)

FOREIGN PATENT DOCUMENTS

| CH | 335713 A | 3/1959 |
|---|---|---|
| DE | 80035 C | 3/1895 |

(Continued)

*Primary Examiner* — Mark A Deuble
(74) *Attorney, Agent, or Firm* — Kenyon & Kenyon LLP (57) ABSTRACT

Provided is a conveying apparatus configured that a rope member is extended between pulleys and a work is suspended on a rope member through a hook member. The object of the present invention is to provide the conveying apparatus making the rope member hard to come off the pulleys and including a bend part. The conveying apparatus for conveying the work along a predetermined conveying route includes a plurality of pulleys, a rope member, and a support member. The hook member is flexible, including a hold part which is a hole into which the rope member is inserted, held by the rope member by inserting the rope member into the hold part. The support member is joined to the hook member, and is suspended on the rope member by inserting the rope member into the hold part.

5 Claims, 10 Drawing Sheets

(56) References Cited

U.S. PATENT DOCUMENTS 5,699,894 A 12/1997 Bestgen et al.
7,784,602 B2 * 8/2010 Mueller ............... B65H 29/003
   198/470.1

FOREIGN PATENT DOCUMENTS

| | | |
|---|---|---|
| GB | 2292339 A | 2/1996 |
| JP | 2006-069697 A | 3/2006 |

* cited by examiner

CONVEYING APPARATUS

CROSS-REFERENCE TO RELATED APPLICATIONS

This is a national phase application based on the PCT International Patent Application No. PCT/JP2013/079381 filed Oct. 30, 2013, claiming priority to Japanese Patent Application No. 2013-083264 filed Apr. 11, 2013, the entire contents of both of which are incorporated herein by reference.

TECHNICAL FIELD

The present invention relates to a conveying apparatus, specifically to a conveying apparatus including a rope-like driven member driven by a driving source.

BACKGROUND ART

Conventionally, there is known a conveying apparatus what is called a belt conveyor which includes rollers rotationally driven by a motor, and a driven member formed in an endless belt, which is driven by the rollers.

Further, conventionally, there is known a conveying apparatus which includes an endless rope-like driven member driven by a motor, and is configured such that the driven member supports a moving member and the moving member holds a work or the like. For example, JP 2006-69697 A as shown below discloses the technology thereof, and the technology is publicly known.

In the conventional conveying apparatus disclosed in JP 2006-69697 A, a guide block as the moving member is connected to a conveying rope as the driven member which is extended between a pair of pulleys. The work held by the guide block is linearly conveyed along the conveying rope rotated by the pair of pulleys by driving the pair of the pulleys by the motor or the like.

This makes it possible to realize a low-cost conveying apparatus provided with a low thrust motor.

CITATION LIST

Patent Literature

PTL1: JP 2006-69697 A

SUMMARY OF INVENTION

Technical Problem

Conventionally, in the conveying apparatus configured such that the endless rope-like driven member is extended between the pulleys such as the conventional conveying apparatus disclosed in JP 2006-69697 A, a conveying route is provided such that the hook connecting the guide block to the driven member linearly reciprocates between the pair of pulleys within a range where the hook does not come to the pulley (that is, within a range where the hook does not come in contact with the pulley).

This is because, the conveying apparatus configured such that the work is conveyed while suspended by the rope-like driven member (hereinafter referred to as the "rope member") needs to be provided with a member for hooking the work (hereinafter referred to as the "hook member") on the rope-like member, and the rope member easily comes off the pulley when the hook member passes through the pulley.

It is hard for the conveying apparatus configured such that the rope member is extended between the pulleys to reverse a conveying direction.

This is because, in the conveying apparatus configured such that the rope member is extended between the pulleys, if the conveying apparatus is provided with a part where the conveying direction reverses (referred to as a "bend part"), the pulley needs to be provided on the bend part, so that the rope member further easily comes off the pulley when the hook member having passed through the pulley.

The invention is made in consideration of the above-mentioned problems. The present invention is the conveying apparatus configured that the rope member is extended between the pulleys and the work is suspended on the rope member through the hook member. The object of the present invention is to provide the conveying apparatus making the rope member hard to come off the pulleys and including the bend part.

Solution to Problem

Problems to be solved by the invention are as described above, and means for solving these problems are explained below.

A first aspect of the present invention is a conveying apparatus for conveying a work along a predetermined conveying route including a plurality of pulleys which is disposed on the conveying route, a rope member which is an endless rope-like member extended between the plurality of pulleys along the conveying route, a support member for holding the work and a hook member for suspending the support member on the rope member. The hook member is flexible, including a hold part which is a hole into which the rope member is inserted, held by the rope member by inserting the rope member into the hold part. The support member is joined to the hook member, and is suspended on the rope member by inserting the rope member into the hold part.

According to a second aspect of the present invention, the hook member is formed by bending a sheet-like base material into inverse U-shape. The hold part is formed above the support member inside the inverse U-shaped base material by joining both bottom ends of the inverse U-shaped base material.

According to a third aspect of the present invention, the sheet-like base material is made of a cloth.

According to a fourth aspect of the present invention, the cloth is made by forming aramid fibers into a sheet.

According to a fifth aspect of the present invention, the hook member has a PET layer made of PET inside the inverse U-shaped base material.

According to a sixth aspect of the present invention, the conveying route has a bend part where a bend direction is reversed.

Advantageous Effects of Invention

The present invention provides the following effects.

In accordance with a first to fifth aspects of the invention, it is possible to prevent a rope member from coming off a pulley when a hook member passes though the pulley.

In accordance with a sixth aspect of the invention, it is possible to improve flexibility of setting a conveying route in a conveying apparatus and to increase the number of the works suspended in the conveying apparatus.

BRIEF DESCRIPTION OF DRAWINGS

FIG. 1 shows a whole configuration of a conveying apparatus as a first embodiment according to the present invention, in which

DESCRIPTION OF EMBODIMENTS

Next, an embodiment according to the present invention is explained.

First, a whole configuration of a conveying apparatus 1 as a first embodiment according to the present invention is explained using the FIGS. 1 to 6.

Figure 1A:
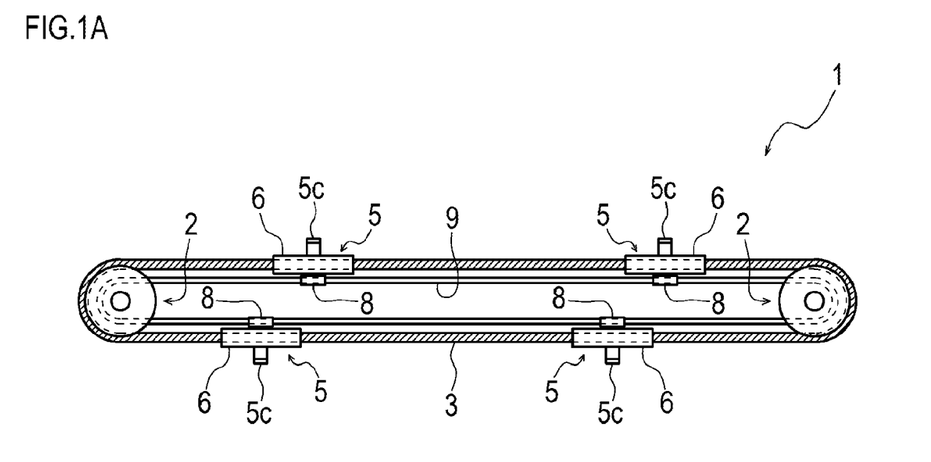
FIG. 1(a) is a plan view.
Figure 1B:
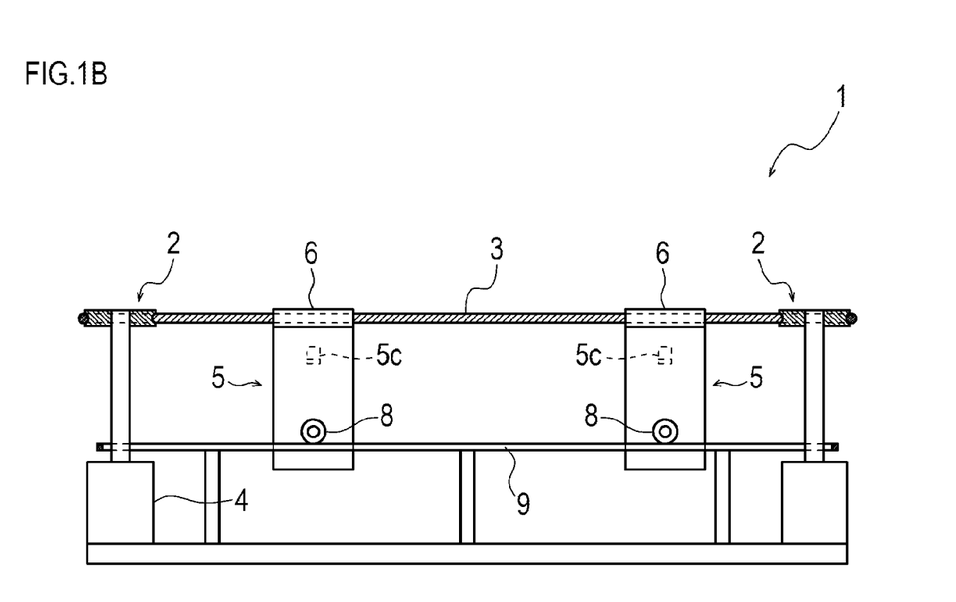
FIG. 1(b) is a sectional side view.

As shown in FIGS. 1(a) and 1(b), the conveying apparatus 1 includes a plurality of pulleys 2 (two pulleys 2 in the present embodiment) and an endless rope member 3, as a driven member, extended between the pulleys 2. In the conveying apparatus 1, the rotating rope member 3 guided by the pulleys 2 is set as a conveying route, and a work is conveyed along the conveying route.

The pulleys 2 are disposed on a desired conveying route.

The conveying apparatus 1 shown in the present embodiment, includes the pair of pulleys 2 (two pulleys 2). However, the conveying apparatus according to the present invention is required to include two pulleys 2 or more. The number of the pulleys may be selected depending on the conveying route to be provided.

In the conveying apparatus 1, the rope member 3 is extended between the pulleys 2 so as to come in contact with the pulleys 2. In this manner, the rope member 3 is disposed on the desired conveying route.

In the conveying apparatus 1, one of the pulleys 2 is rotationally driven by a motor 4 as a driving source, and the rope member 3 extended between the pulleys 2 is rotated along the conveying route by the rotationally driving force applied by the motor 4 through pulley 2.

The rotational force is transmitted through the rope member 3 to the pulley 2 which is not driven by the motor 4, and thereby the pulley 2 is rotated.

That is, in the present embodiment, the pulley 2 shown in the left of the FIGS. 1(a) and 1(b) is rotationally driven, and the pulley 2 shown in the right of the FIGS. 1(a) and 1(b) is rotated through the rope member 3.

The rope member 3 is an endless rope formed in a continuous loop whose ends are connected to each other.

A rope used as the rope member 3 may be made of a variety of materials including natural fiber such as cotton and chemical fiber such as nylon.

In the conveying apparatus 1, the rope member 3 is driven (rotated) using the friction force generated between the pulley 2 and rope member 3. Therefore, if the rope member 3 is stopped by an operator's hand or the like, the pulley 2 idles in relation to the rope member 3.

A tensioner (not illustrated) or the like applies tension to the rope member 3 extended between pulleys 2. Therefore, the rope member 3 extended between pulleys 2 is reliably fitted to grooves of the pulley 2 so as not to fall off the pulley 2.

Figure 2:
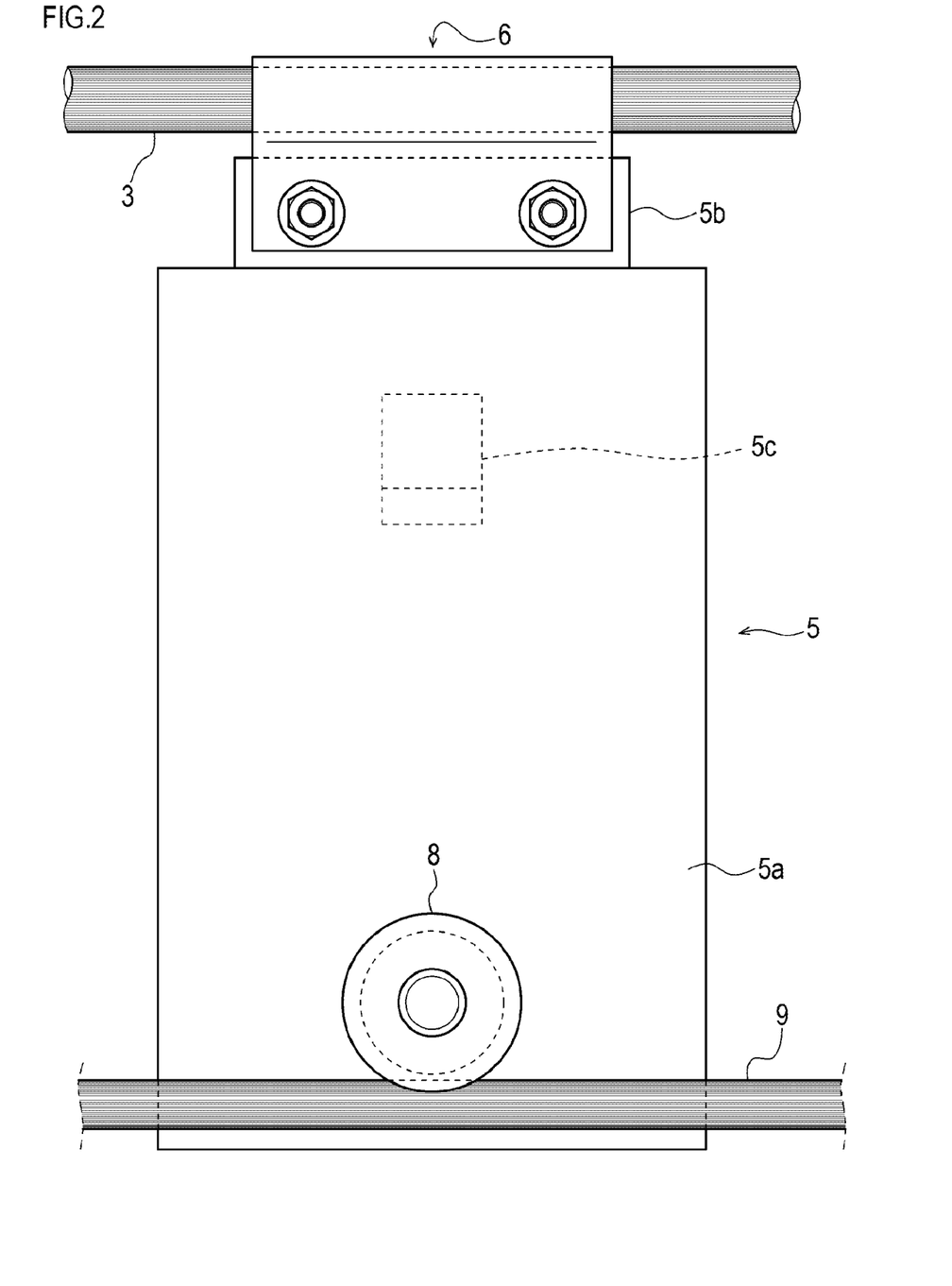
FIG. 2 is a side view showing a state of suspending a palette in the conveying apparatus as the embodiment according to the present invention.
Figure 3:
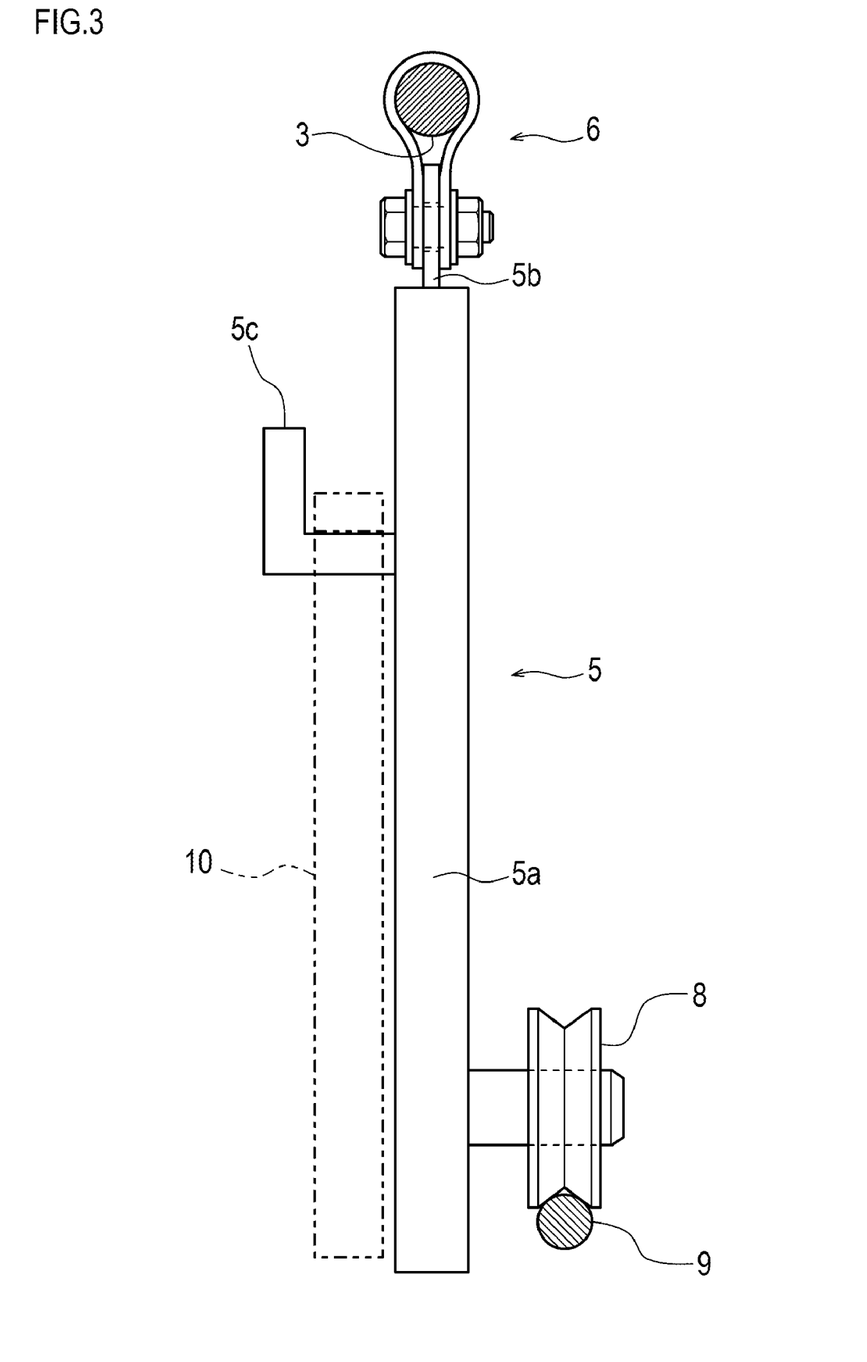
FIG. 3 is a front view showing the state of suspending the palette in the conveying apparatus as the embodiment according to the present invention.

As shown in FIGS. 2 and 3, the palettes 5 as a support member for holding the work 10 are suspended on the rope member 3.

In the conveying apparatus 1 as an embodiment according to the present invention, a hook member 6 is used as a member for suspending the palette 5 on the rope member 3.

Figure 4:
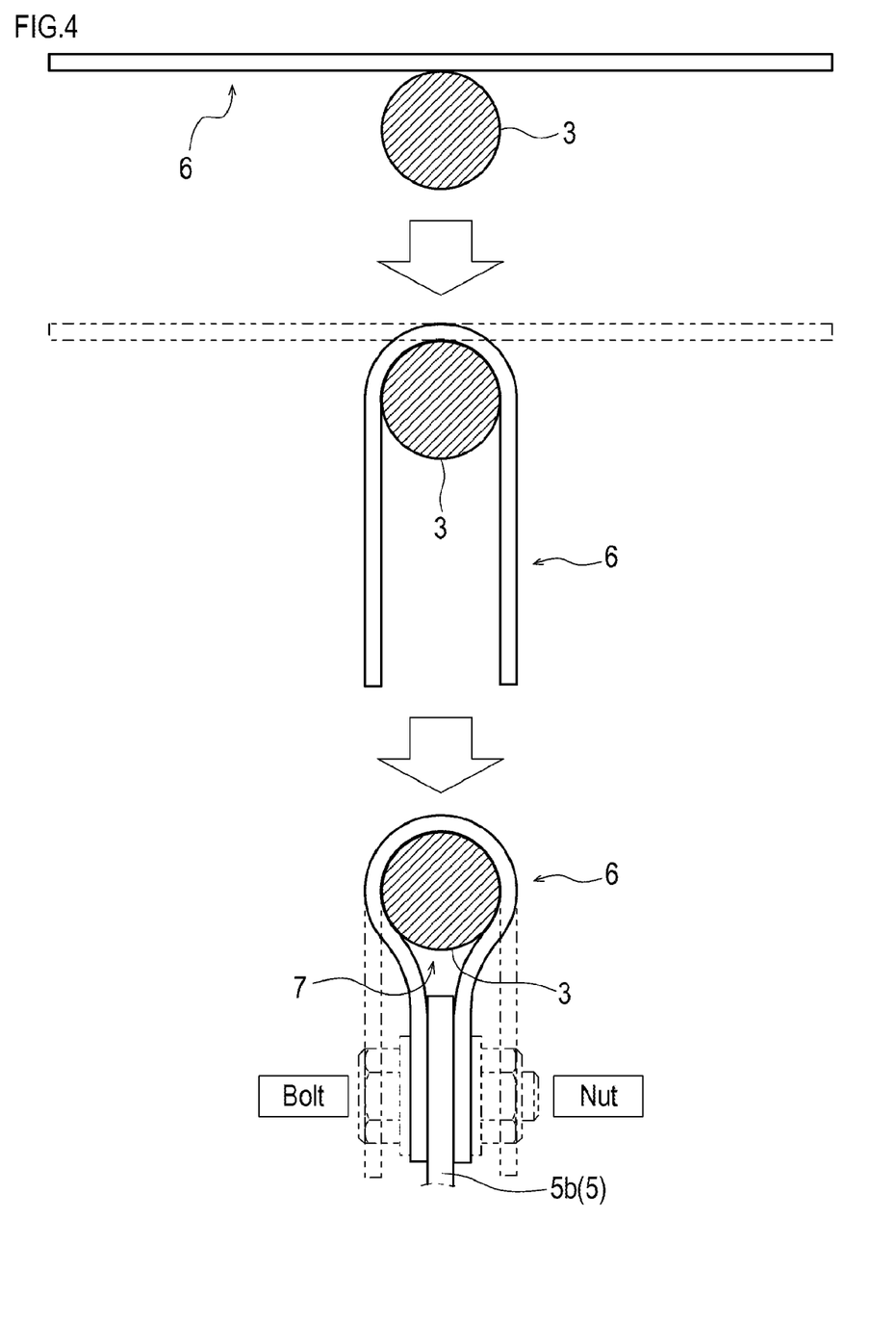
FIG. 4 shows a state of bending a hook member in the conveying apparatus as the embodiment according to the present invention.

The hook member 6 is made of a flexible material. As shown in FIG. 4, the hook member 6 includes a hold part 7 which is a hole into which the rope member 3 is inserted.

The hook member 6 shown in the present embodiment is made by bending sheet-like material in inverse U-shape. Both bottom ends of the hook member 6 bent in inverse U-shape is joined with a bolt and a nut together with the palette 5 (more particularly, a joint 5b) so as to form the hold part 7 into which the rope member 3 is inserted in the upper part of the palette 5.

The term "flexible" employed herein means having such flexibility that the hook member 6 can change in shape along the shape of the pulley 2 when the hook member 6 guided by the rope member 3 passes through the pulley 2.

Thus, the hook member 6 made by bending the sheet-like material in inverse U-shape has the advantage of being made easily without using any special facility.

In the present embodiment, the hook member 6 is joined to the palette 5 with the bolt and the nut. However, the hook member 6 may be attached or detached to the palette 5 by the one-touch operation of a button or a hook, for example. In this case, the hook member 6 and the palette 5 can easily be attached or detached to the rope member 3.

The hook member 6 is used to be hooked on the rope member 3 such that a curve part of the sheet-like material bent in inverse U-shape is disposed on the upper side and two edges continuously extending from the curve part are disposed on the lower side.

The term of "the inverse U-shape" mentioned herein widely includes an aspect such that the curve part of the bent sheet-like material is disposed on the upper side and two edges continuously extending from the curve part are disposed on the lower side. For example, it includes an aspect such that the parts below the curve part are close to each other (it looks slightly different from the inverse U-shape), shown in the lower in FIG. 4.

Figure 5:
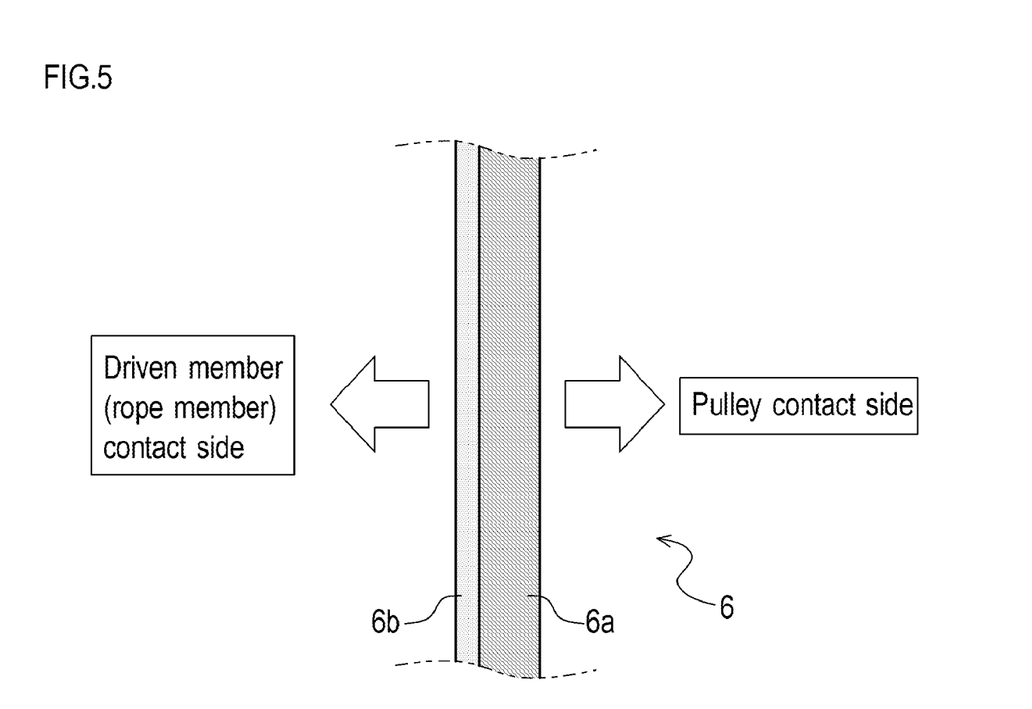
FIG. 5 is a partially detail view showing a configuration of the hook member in the conveying apparatus as the embodiment according to the present invention.

As shown in FIG. 5, the hook member 6 has two layers consisting of a base material 6a and a PET layer 6b.

The base material 6a included in the hook member 6 in the conveying apparatus 1 is made of cloth, and has such flexibility as to change the shape thereof along the shape of the pulley 2 and such strength as to bear the load of the palette 5 and the work 10.

Specifically, the cloth made of aramid fibers with excellent wear resistance is used as the base material 6a in the conveying apparatus 1. If the hook member 6 comes in contact with the pulley 2, the hook member 6 is difficult to be cut, and the durability thereof is secured.

A layer made of PET (polyethylene terephthalate) (referred to as the PET layer 6b) is formed on a face (the inner face in bending) where a hold part 7 of the base material 6a in the conveying apparatus 1 is formed.

If the rope member 3 inserted into the hold part 7 directly rubs against the base material 6a made of the aramid fibers, the rope member 3 may be damaged. However, the conveying apparatus 1 has the PET layer 6b on the inner face of the base material 6a, which makes it possible to prevent the rope member 3 from being damaged by the hook member 6.

The PET layer 6b protects the rope member 3 against the base material 6a and reduces a coefficient of friction between the rope member 3 and the hook member 6.

Figure 6:
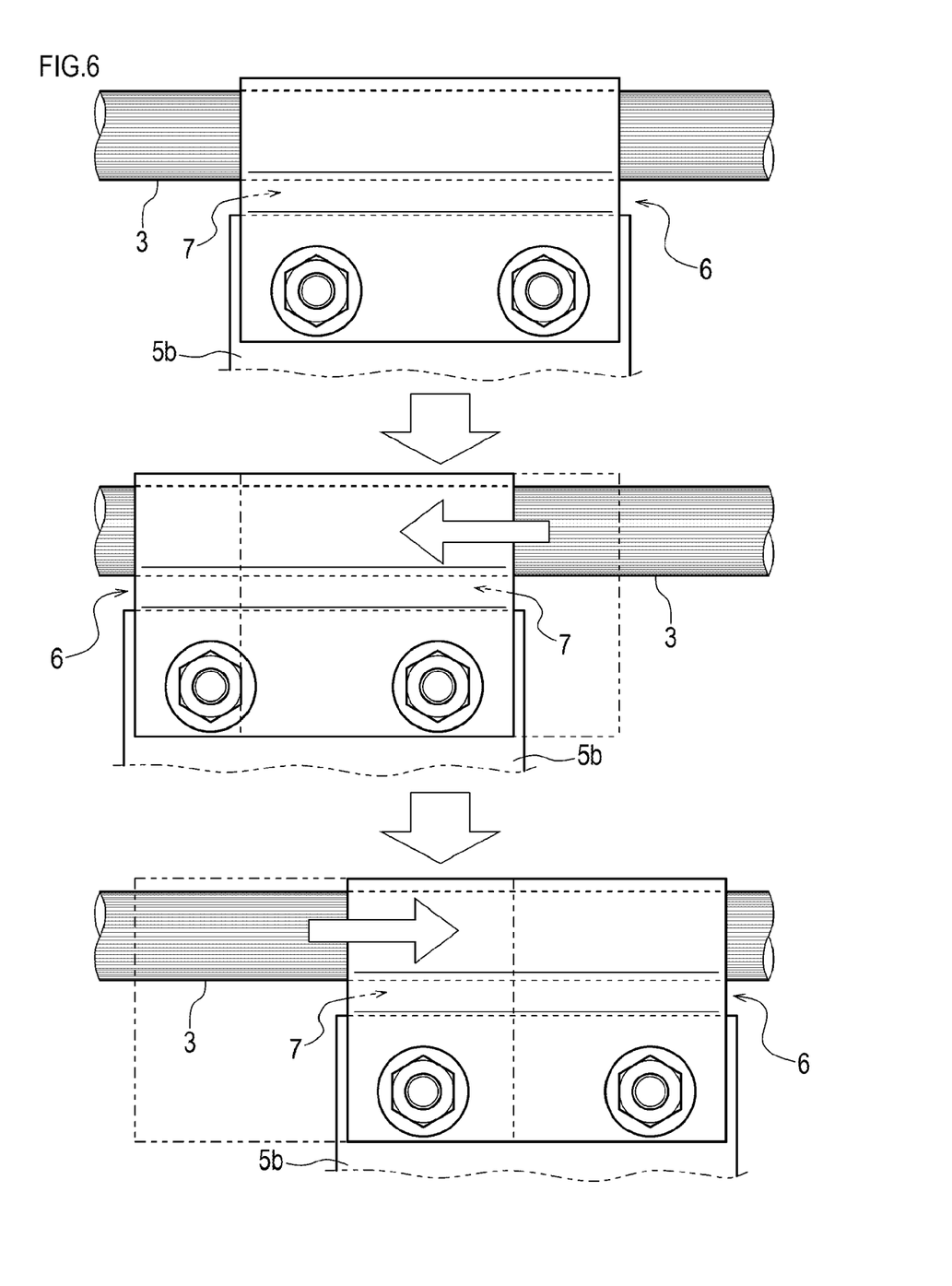
FIG. 6 shows a state where the hook member is moved relative to a rope member in the conveying apparatus as the embodiment according to the present invention.

As shown in FIG. 6, if force such that a person pushes the hook member is given in the conveying direction, the hook member 6 slides on the rope member 3.

If the palette 5 moved together with the rope member 3 is held by a person, the hook member 6 and palette 5 idles in relation to the rope member 3.

The sheet-like hook member 6 made of aramid fibers is explained. However the material for the sheet-like hook member 6 may be rubber, synthetic resin or the like, and a variety of materials may be adopted.

The shape of the hook member 6 is not limited to the sheet-like shape. The shape of the hook member 6 changes along the shape of the pulley 2 when the hook member 6 passes through the pulley 2 guided by the rope member 3.

As show in FIGS. 2 and 3, the palette 5 is a member for holding the work 10, and includes a body part 5a, a joint part 5b and a hook part 5c.

The body part 5a is provided with a support roller 8 rotationally supported by an axis.

The joint part 5b is a part for jointing to the hook member 6 and includes holes (not illustrated) into which the bolts are inserted. The joint part 5b and the hook member 6 are fastened by the bolts and the nuts, so that the joint part 5b is connected to the hook member 6.

The coefficient of friction between the rope member 3 and the hook member 6 in the support part 7 is adjusted by changing the position where the bolts and the nuts are fastened, or by changing the size, the shape or the like of a washer.

The hook member 5c is a member for hooking the work 10 on the palette 5. A hook shape is selected depending on the shape, size or the like of the work 10.

In the present embodiment, the work 10 is held to be hooked on the palette 5. However, the palette 5 holding the work 10 is not limited thereto. Various aspects including placing, holding to fit it into, or the like are adopted.

That is, in the conveying apparatus 1, the pulley 2 is rotated by the driving power of the motor 4, and the rope member 3 coming in contact with the pulleys 2 rotates on the conveying route, so that the palette 5 and the work 10 suspended on the rope member 3 are conveyed along the conveying route.

The conveying apparatus 1 includes a support rail 9 along the position where the palette 5 is moved according to the rotation of the rope member 3.

The support rail 9 is fixed to a flame vertically disposed on a base of the conveying apparatus 1, and supports the load acting in the vertical direction.

The support roller 8 provided on the palette 5 rotates on the support rail 9 when the palette 5 is moved according to the rotation of the rope member 3.

That is, in the conveying apparatus 1, the rope member 3 applies the driving force in the conveying direction to the palette 5, and the support rail 9 absorbs the load acting on the palette 5 downward in the vertical direction caused by the weight of the work 10 or the like.

This make it possible to prevent the rope member 3 from drooping downward due to the weight thereof, and reliably prevent the rope member 3 from falling off the pulleys 2, even if the palette 5 holds the work 10.

In the present embodiment, the support roller 8 includes a substantially V-shaped groove to which the support rail 9 is fitted. This make it possible to prevent the palette 5 from swinging from side to side in the conveying direction, and to make the palette 5 (consequently the conveying state of the work 10) further steady when the palette 5 is moved guided by the rope member 3.

Figure 7:
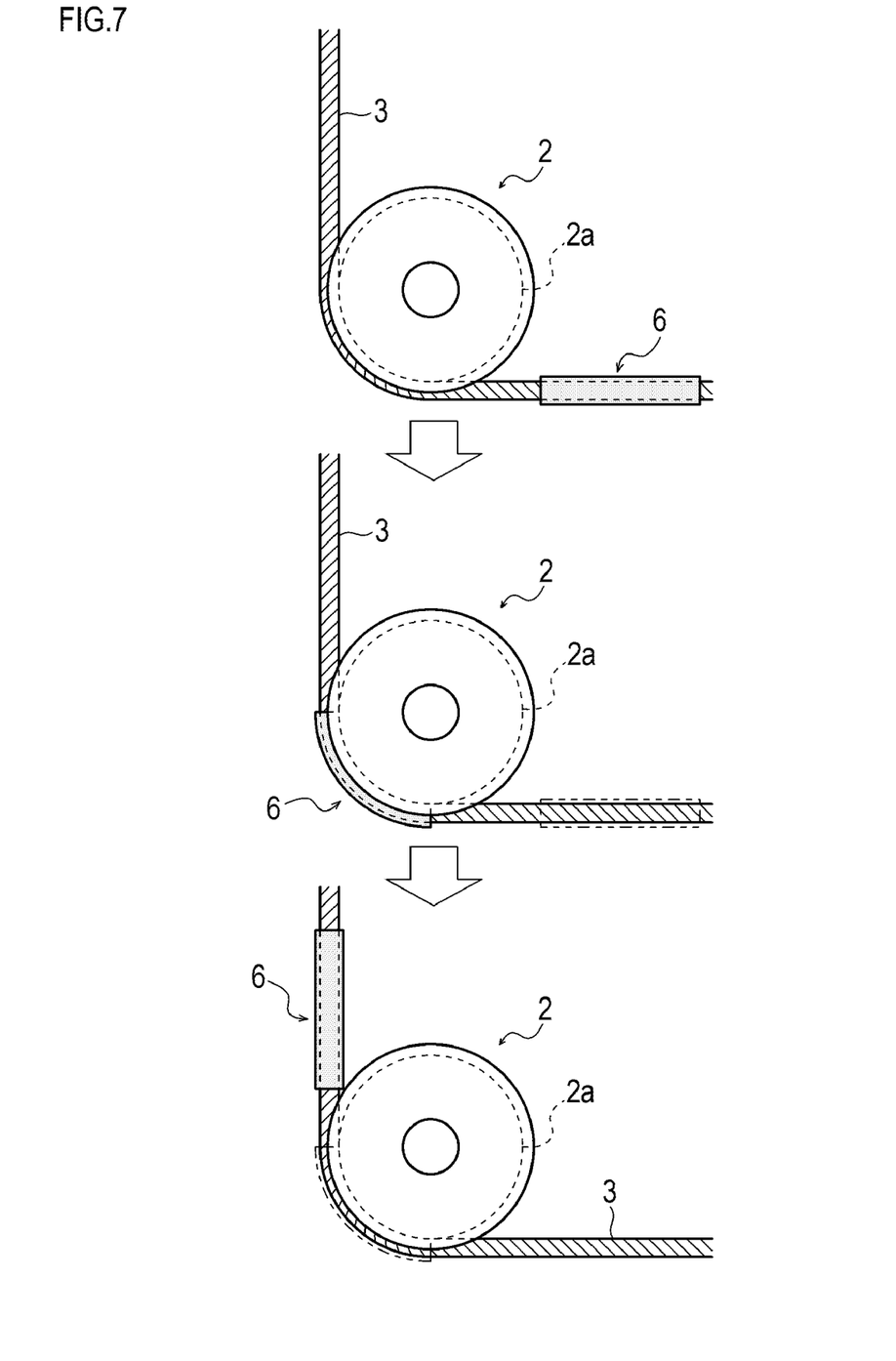
FIG. 7 shows a state where the hook member passes through a pulley in the conveying apparatus as the embodiment according to the present invention.
Figure 8:
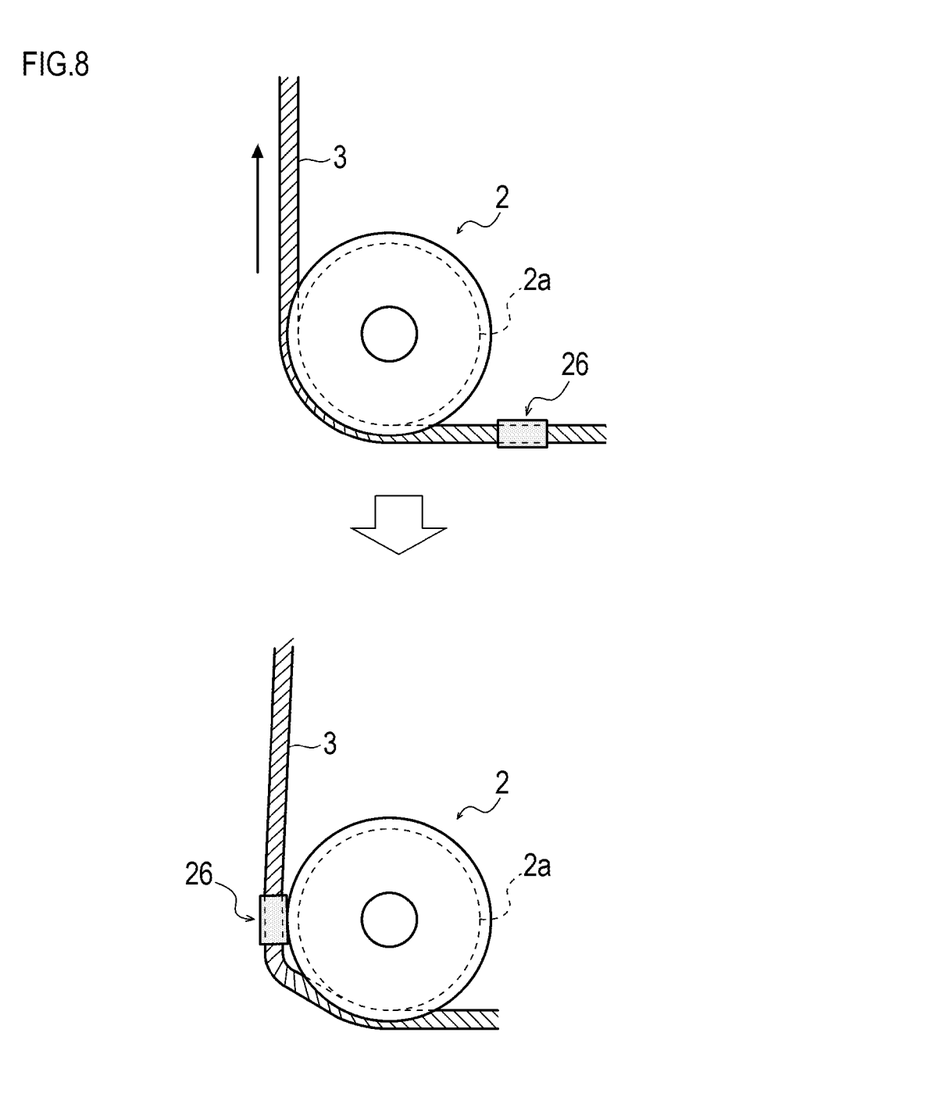
FIG. 8 shows a state where a hook member passes through a pulley in a conventional conveying apparatus (a hard hook member is provided).

A situation where the hook member passes through the pulley is explained, using FIGS. 7 and 8.

For example, as shown in FIG. 8, if a conventional hook member 26 made of the hard material such as metal is used as a hook member for suspending the palette 5 on the rope member 3, the hook member 26 does not change in shape to fit the pulley 2 (the groove 2a). Therefore, the hook member 26 separates from the groove 2a when the hook member 26 passes through the pulley 2.

The rope member 3 may fall off the pulley 2 in a place where the hook member 26 separates from the pulley 2, or the hook member 26 may be caught around the pulley 2.

On the other hand, as shown in FIG. 7, if the hook member 6 made of the flexible sheet-like member (cloth in the present embodiment) is used, the hook member 6 changes in shape to fit the groove 2a of the pulley 2 integrally with the rope member 3. Therefore, the hook member 26 does not separate from the groove 2a when the hook member 26 passes through the pulley 2.

The hook member 6 in the conveying apparatus 1 does not separate from the groove 2a. Therefore, the hook member 6 can smoothly pass the pulley 2 integrally with the rope member 3, and the rope member 3 does not fall off the pulley 2.

The conveying apparatus 1 as the first embodiment according to the invention is the conveying apparatus for conveying the work 10 along the predetermined conveying route comprising the plurality of pulleys 2 which is disposed on the conveying route, the rope member 3 which is the endless rope-like member extended between the plurality of pulleys 2 along the conveying route, the palette 5 for holding the work 10 and the hook member 6 for suspending the palette 5 on the rope member 3. The hook member 6 is flexible, including the hold part which is the hole into which the rope member 3 is inserted, held by the rope member 3 by inserting the rope member 3 into the hold part 7. The palette 5 is joined to the hook member 6, and is suspended on the rope member 3 by inserting the rope member 3 into the hold part 7.

In the conveying apparatus 1 as the first embodiment according to the invention, the hook member 6 is formed by bending the sheet-like base material 6a into inverse U-shape. The hold part 7 is formed above the palette 5 inside the inverse U-shaped base material 6a by joining both bottom ends of the inverse U-shaped base material 6a.

In the conveying apparatus 1 as the first embodiment according to the invention, the sheet-like base material 6a is made of a cloth. The cloth is made by forming aramid fibers into a sheet. The hook member 6 has a PET layer made of PET inside the inverse-U shaped base material 6a.

This makes it possible to prevent the rope member 3 from coming off the pulley 2 when the hook member 6 passes through the pulley 2.

In the conveying apparatus 1, the conveying route need not be limited to a route such that the hook member 6 reciprocates between the pair of pulleys 2 within a range where the hook member 6 does not come to the pulley 2 (that is, within a range where the hook member 6 does not come in contact with the pulley 2), and it is possible to set the conveying route such that the work 10 is moved along the rope member 3.

Figure 9:
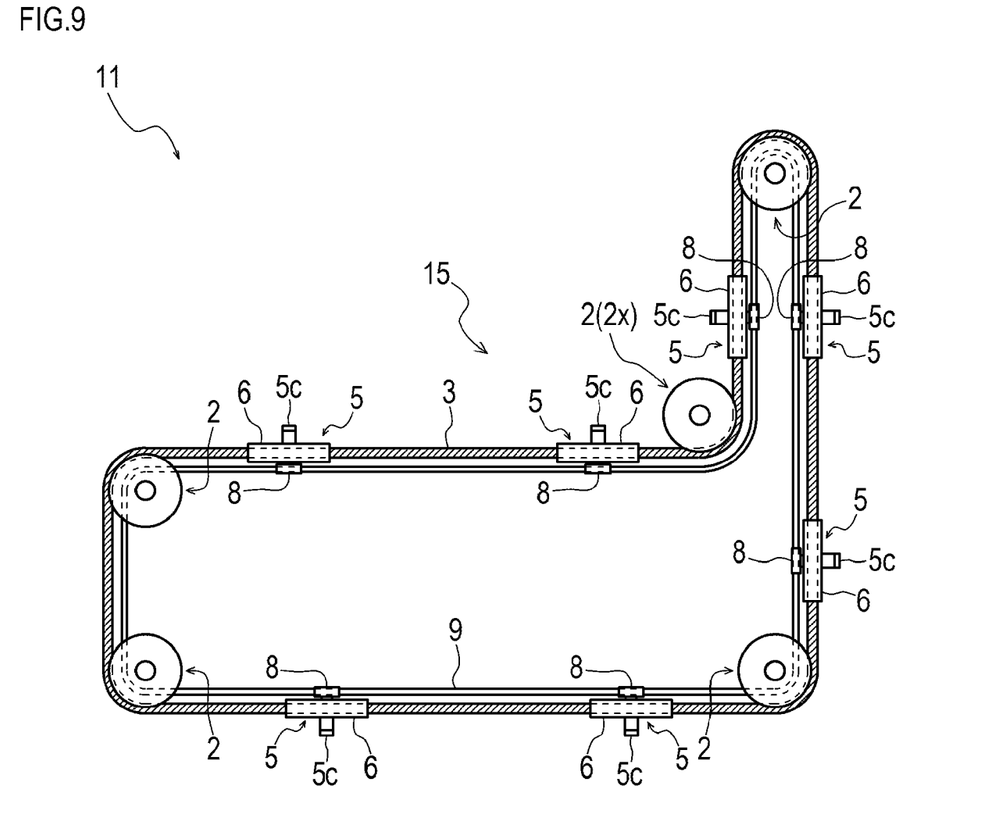
FIG. 9 is a plan view showing a whole configuration of a conveying apparatus as a second embodiment according to the present invention.
Figure 10:
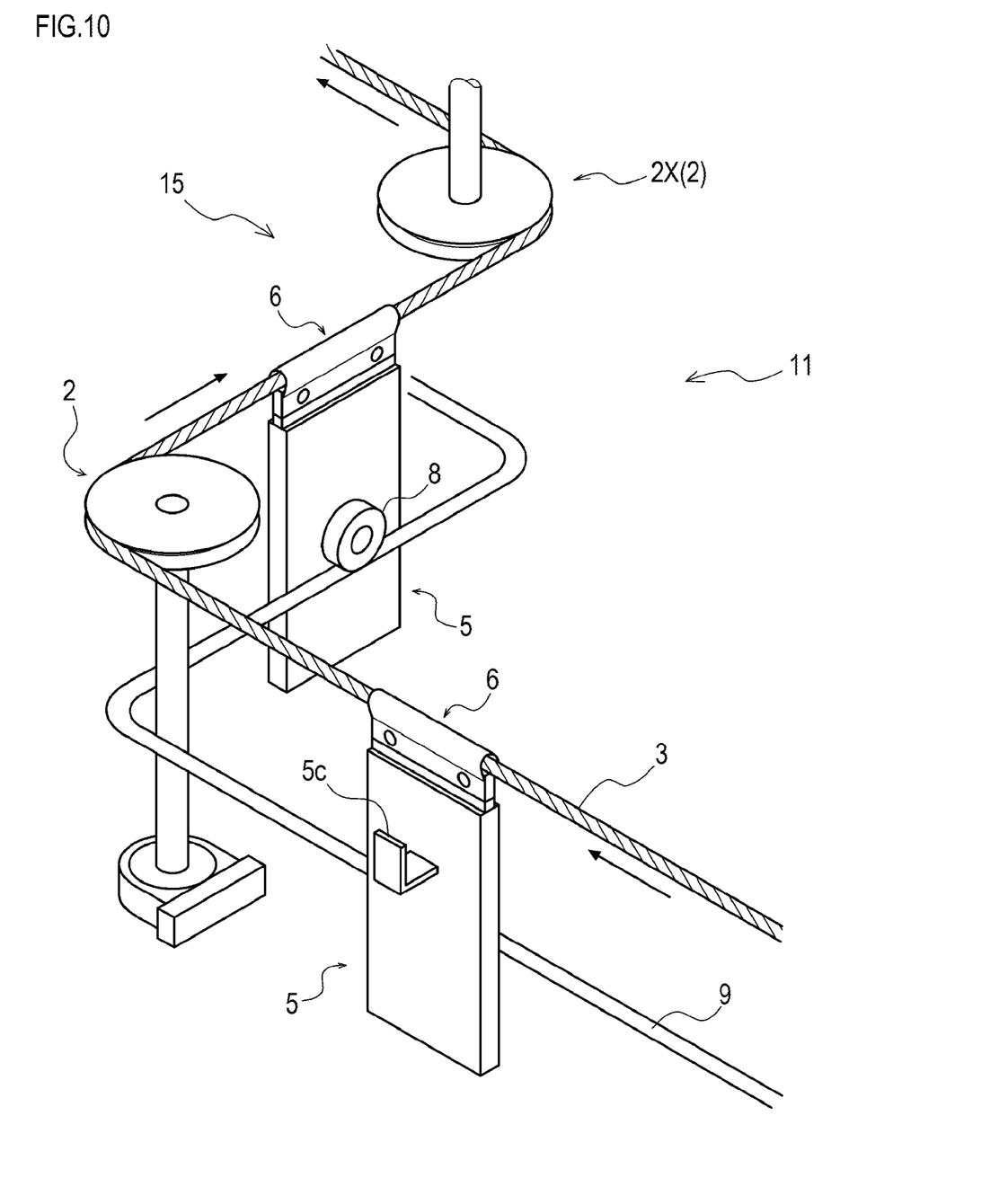
FIG. 10 is a partially perspective view showing the conveying apparatus as the second embodiment according to the present invention.

A whole configuration of a conveying apparatus 11 as a second embodiment according to the present invention is explained, using FIGS. 9 and 10.

As shown in FIG. 9, the conveying apparatus 11 includes the plurality of pulleys 2 (five pulleys 2 in the present embodiment), the endless rope member 3 extended between the pulleys 2 as a driven member. In the conveying apparatus 11, the rotating rope member 3 guided by the pulleys 2 is set as a conveying route, and the work is conveyed along the conveying route.

The conveying apparatus 11 has a bend part 15 where the bend direction is reversed on the conveying route, and differs from the conveying apparatus 1 as the first embodiment in setting substantially L-shaped conveying route as a whole.

The wording "the bend direction is reversed" employed herein means that, for example, the conveying route which has generally bent clockwise is bent counterclockwise, and includes the pattern reversed to be bent from clockwise to counterclockwise and the pattern reversed from counterclockwise to clockwise.

As shown in FIGS. 9 and 10, if the bend part 15 is set on the conveying route, it is necessary to provide the pulley 2 (referred to as the pulley 2X) disposed on the outside of the rope member 3 in plan view in order to guide the rope member 3.

Therefore, in the hook member 6 used in the conveying apparatus 11 provided with the bend part 15, both right and left sides of the hook member 6 in the direction where the rope member 3 rotates come in contact with the pulley 2.

In the conveying apparatus 11 as the second embodiment, the hook member 6 includes the base material 6a as the sheet-like member, and both right and left sides of the hook member 6 in the direction where the rope member 3 rotates are the same material.

Therefore, if the bend part 15 is set and both the right and left sides of the hook member 6 come in contact with the pulley 2, the hook member 6 easily fits the groove 2a of the pulley 2, and therefore the hook member 6 does not separate from the pulley 2 (the groove 2a).

The conveying apparatus 11 including the bend part 15 is realized, by using the sheet-like hook member 6 as a member for suspending the palette 5 on the rope member 3.

The conveying apparatus 11 as the second embodiment according to the invention is the conveying apparatus for conveying the work 10 along the predetermined conveying route comprising the plurality of pulleys 2 which is disposed on the conveying route, the rope member 3 which is the endless rope-like member extended between the plurality of pulleys 2 along the conveying route, the palette 5 for holding the work 10 and the hook member 6 for suspending the palette 5 on the rope member 3. The hook member 6 is formed by bending the sheet-like base material 6a into inverse U-shape. The hold part 7 is formed above the palette 5 inside the inverse U-shaped base material 6a by joining both bottom ends of the inverse U-shaped base material 6a. The palette 5 is suspended on the rope member 3 by inserting the rope member 3 into the hold part 7.

This makes it possible to prevent the rope member 3 from coming off the pulley 2 when the hook member 6 passes through the pulley 2.

In the conveying apparatus 11 as the second embodiment according to the invention, the conveying route has a bend part 15 where a bend direction is reversed.

The conveying apparatus 11 including the bend part 15 can improve flexibility of the conveying route by changing the conveying direction to various directions.

The conveying apparatus 11 including the bend part 15 can set the longer conveying route than the conventional one, and can increase the number of the works 10 suspended in the conveying apparatus 11.

The conveying apparatus 11 including the bend part 15 has the high flexibility of the conveying route, and an additional conveying apparatus 11 can be disposed in an empty space such as the upper part of an existing conveying apparatus (for example, a belt-conveyer-type conveying apparatus).

The conveying apparatus 1 or 11 as the present invention can be disposed to stock upward with two or three tiers, which makes it possible to improve the space utilization efficiency in the process where the conveying apparatus is disposed, and to further increase the stocked number.

Each of the conveying apparatuses 1 and 11 shown in the present embodiment shows the case where the rotational axial direction of the pulley 2 is the vertical direction. However, for example, in the conveying apparatus according to the present invention, the rotational axis of the pulley 2 may be arranged in the horizontal direction. An additional conveying apparatus including the rope-like driven member according to the present invention may be set by using (horizontal) rotary shafts of the conventional belt-conveyer-type conveying apparatus and attaching pulleys on the rotary shafts.

INDUSTRIAL APPLICABILITY

A conveying apparatus according to the present invention is applicable to not only use for conveying a work such as a machine part, but also use for conveying various goods (for example, food or the like), and is used in the widely various industries.

The invention claimed is:
1. A conveying apparatus for conveying a work along a predetermined conveying route, comprising:
a plurality of pulleys which is disposed on the conveying route;
a rope member which is an endless rope member extended between the plurality of pulleys along the conveying route;
a support member for holding the work; and
a hook member for suspending the support member on the rope member;
wherein the hook member is flexible, including a hold part which is a hole into which the rope member is inserted,
wherein the hook member is held by the rope member by inserting the rope member into the hold part, wherein the support member is joined to the hook member, and is suspended on the rope member by inserting the rope member into the hold part, wherein the hook member is formed by bending a sheet material into inverse U-shape, and wherein the hold part is formed above the support member inside the inverse U-shaped sheet material by joining both bottom ends of the inverse U-shaped sheet material.

2. The conveying apparatus according to claim 1, wherein the sheet material is made of a cloth.

3. The conveying apparatus according to claim 2, wherein the cloth is made by forming aramid fibers into a sheet.

4. The conveying apparatus according to claim 2, wherein the hook member has a PET layer made of PET inside the inverse U-shaped sheet material.

5. The conveying apparatus according to claim 1, wherein the conveying route has a bend part where a bend direction is reversed.

\* \* \* \* \*